(12) United States Patent
Ma et al.

(10) Patent No.: US 12,147,564 B1
(45) Date of Patent: Nov. 19, 2024

(54) DATA SUBJECT ERASURE ACROSS MULTIPLE DISTRIBUTED DATA REPOSITORIES

(71) Applicant: Amazon Technologies, Inc., Seattle, WA (US)

(72) Inventors: Shuai Ma, Seattle, WA (US); Jerry Bullard, Kirkland, WA (US); Willy Tanggono, Seattle, WA (US); Ziqing Guo, Redwood City, CA (US); Bo Lyu, Seattle, WA (US); Peng Yao, Seattle, WA (US); Vinay Krishna Nelly, Seattle, WA (US); Keyur Shaileshkumar Patel, Seattle, WA (US); Nitin Gaur, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 333 days.

(21) Appl. No.: 17/548,231

(22) Filed: Dec. 10, 2021

(51) Int. Cl.
 *H04L 29/06* (2006.01)
 *G06F 16/16* (2019.01)
 *G06F 21/62* (2013.01)

(52) U.S. Cl.
 CPC ........ *G06F 21/6245* (2013.01); *G06F 16/162* (2019.01); *G06F 2221/2101* (2013.01)

(58) Field of Classification Search
 CPC ... G06F 21/6272; G06F 21/60; G06F 21/6245
 See application file for complete search history.

(56) References Cited

U.S. PATENT DOCUMENTS

| 10,346,638 | B2 | 7/2019 | Barday et al. |
| 11,294,604 | B1* | 4/2022 | McMullan ............ G06F 3/0659 |
| 11,443,062 | B2* | 9/2022 | Latka .................... H04L 9/3231 |
| 2021/0383370 | A1* | 12/2021 | Tippets ................ G06Q 20/383 |

FOREIGN PATENT DOCUMENTS

EP   3477527   1/2019

* cited by examiner

*Primary Examiner* — Jason K Gee
(74) *Attorney, Agent, or Firm* — Robert C. Kowert; Kowert, Hood, Munyon, Rankin & Goetzel, P.C.

(57) ABSTRACT

A data deletion notification service registers data repositories that store personal data. The service receives requests from users to delete personal data, sends notifications of the deletion requests to the registered data repositories, and stores deletion records recording the deletions and a timestamp associated with the deletion request. The service may wait for confirmation of the deletions from the data repositories, resending the deletion requests if a confirmation is not received, and recording confirmation in an audit record. Data repositories performing a restoration may request, from the service, a list of users that have requested deletion of personal data since the time of the creation of the backup used for restoration. The service may generate, based on deletion records with corresponding timestamps, the list of users and respond to the request with the list. Confirmations of the deletions may be tracked, stored and made available via an audit interface.

20 Claims, 10 Drawing Sheets

DATA SUBJECT ERASURE ACROSS MULTIPLE DISTRIBUTED DATA REPOSITORIES

BACKGROUND

Some data storage systems store data in a distributed manner across multiple machines, such as but not limited to storing data across multiple repositories of corresponding services of a service provider. In some such storage systems, a piece of data (e.g., personal user data or the like) may be stored across multiple machines, and that piece of data may reoccur for multiple services, making erasure of that piece of data from each of numerous repositories for all of the services of the overall system a challenge.

For example, some of the services store a piece of data in a primary repository (sometimes as multiple instances of the piece of data stored in a cluster of storage nodes or similar) and also retain backups of the piece of data in a secondary repository (e.g., to be used to restore the piece of data in case of a failure of the primary repository or in case of accidental erasure or the like).

In some such systems, a piece of data may be deleted from the primary repository (e.g., in a normal course of business) but be retained in the secondary repository. Restoration of data from a backup may unintentionally reintroduce data that was previously deleted, in some instances.

Figure 1A:
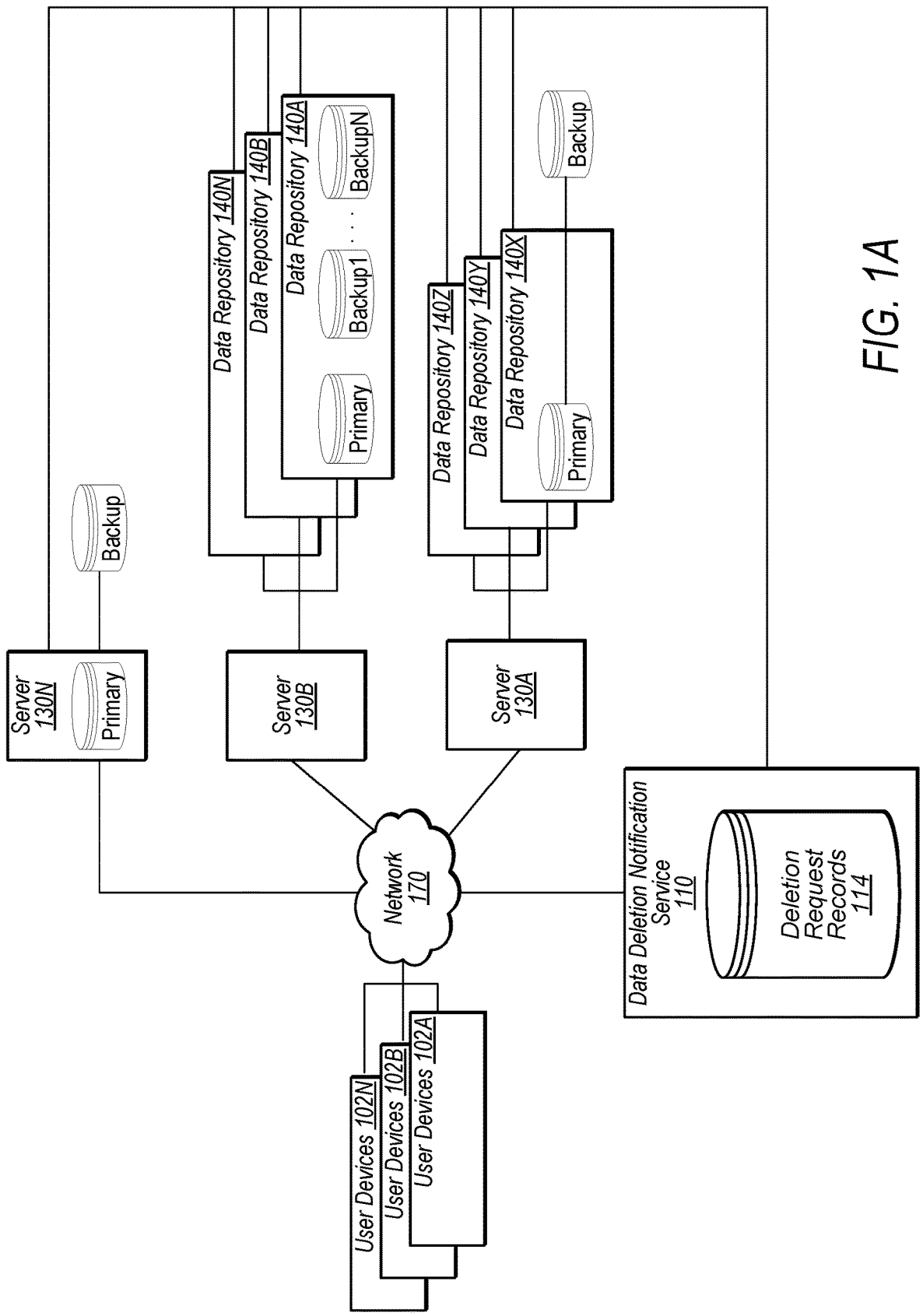
FIGS. 1A, 1B, 1C are block diagrams illustrating various system architectures for a system that implements data subject erasure across multiple distributed data repositories, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

Various embodiments described herein relate to data subject data erasure across multiple distributed data repositories. As explained above, in some storage systems, a piece of data for just one of the services may be stored across multiple machines supporting that service, and that piece of data may reoccur for multiple services, making erasure of that piece of data from each of numerous repositories for all of the services of the overall system a challenge. For example, a user associated with a delete subject id (e.g., a username, a user account, etc.) as a piece of data in a system may request to opt-out of the system altogether—requesting to have all the personal data associated with that user deleted. The delete subject id may have been reproduced and stored through numerous various data stores in the system, making thorough deletion of the delete subject id a challenge.

Non-exhaustive examples of potential challenges include the data subject's data (e.g., delete subject id or other personal data) being stored differently in each data repository (e.g., according to customer logic for the repository), multiple repositories needing to be notified to delete the data subject's data, the repositories not receiving the command to delete data subject's data, a lack of tracking of deletion confirmations for audits, and furthermore, data restorations performed for data repositories may unintentionally restore deleted data subject's data after that data subject's data had been deleted.

A data notification service, described herein over various embodiments, may solve at least some of the above-noted challenges. In some embodiments, the Data Deletion Notification Service 110 is a single endpoint where users can request deletion of personal data, but the service carries out deletions of the user's personal data across distributed, even unrelated, data repositories that the requesting user may not even know about. The data deletions may be recorded in a data store and provided as a batch to data repositories that are restoring data based on backups that retain personal user data that was deleted from a primary data store. The batches may be used to ensure previously-deleted data is not mistakenly introduced via the restoration.

For example, in some embodiments, the data deletion notification service may keep records of data subject requests to delete the subject's data (e.g., sometimes, but not necessarily limited to a user's personal data). The notification service may keep records of some or all data repositories in a system, such as a network-based service provider system, or the like, and may disseminate data deletion notifications to the data repositories, based on a single deletion request from a deletion-requesting user. In some embodiments, the notification service may await confirmations from data repositories regarding deletion of a data subjects' data, resending the deletion request if confirmation of the deletion is not received.

In a particular example, before a data repository launches, a data repository may be required to register itself to the notification service (e.g., Notification Service 730, described below), and to create a workflow (e.g., customized to the particular logic of the data repository) to delete a data subject's data in its repository upon receiving a deletion request. Various repositories include proprietary logic and are better suited to handling the data deletions in their own manner, in some embodiments. Furthermore, the data repository may listen for the notification service's deletion notifications to delete a subject's data. For example, when the notification service receives a data subject's request to delete its data, the notification service generates notifications and delivers the notifications to all registered data repositories. Each data repository executes a respective custom data deletion workflow to delete the data, and after deleting the data, each data repository sends a message back to notification service, confirming the data subject's data is deleted, in embodiments. If the notification service does not receive the deletion complete confirmation from any one of the data repositories, it may keep re-sending the request to the data repository.

In some embodiments, instead of listening for individual deletion notifications, the data repositories may be configured to make requests for the latest data deletion requests (e.g., as a batch, periodically, etc.).

In cases of a data repository performing a restoration, a data deletion notification service may maintain non-personally identifiable metadata (e.g., an account ID or other, possibly obfuscated) in an audit repository to enable re-deletion upon any data restoration operation to ensure compliance with the data subject's request throughout the retention window, in embodiments. When the data repository restores its data to a previous state (e.g., based on a backup) the data repository may ask the notification service for a list of all the data deletion requests from the previous state to the present state. The data repository may then delete all data subject's data for all entries in the list. For example, a data restoration operation event can be processed by the timestamp when the backup was taken and any deletion requests logged after that timestamp can be re-deleted as needed.

Attention will now be drawn to the Figures. FIGS. 1A, 1B, 1C, 2, 7 and 8 are block diagrams of components that may perform functionality associated with the processes illustrated in FIGS. 3-6, in some embodiments. For example, the Data Deletion Notification Service 110 (implemented by components in FIGS. 7 and 8, in embodiments) may perform the functionality depicted in FIGS. 3-5 and the Data Repositories 140A-N and 140X-Z (implemented by components in FIGS. 7 and 8, in embodiments) may perform functionality depicted in FIG. 6, in embodiments.

FIG. 1A is a block diagram illustrating a system architecture of a system that implements data subject erasure across multiple distributed data repositories, according to some embodiments. In some embodiments (e.g., systems with multiple layers of servers and repositories or similar) personal user data may be stored across one or more distributed data repositories of which the user is unaware. The user may not even have access that would allow the user to request deletion of such personal data, even if the user was aware of it. In some such systems, users may be incapable of ensuring thorough deletion of personal user data across the numerous repositories. Various embodiments of the Data Deletion Notification Service described herein may provide functionality that would otherwise be impossible for users to even request, to say nothing of perform thoroughly in a distributed environment.

FIG. 1A illustrates a network-based distributed data processing and storage system with multiple Servers 130A, 130B, 130N that process requests from various types of multiple User Devices 102A-102N sent over Network 170. Generally, the Servers 130A-N may act as a front-end for accessing or processing requests associated with data stored in corresponding Data Repositories 140A-N and 140X-Z. In embodiments, data repositories may include a system that stores data (e.g., application logic or a service with functionality that causes personal user data to be obtained and/or stored) as well as the data store to which the data is stored.

Some servers, such as Server 130N, may store a primary data store at the server, in embodiments. Other architectures, with more layers and additional components are contemplated and operate within the scope of this disclosure, without limitation, in embodiments. In the illustrated embodiment, Data Repository 140A is illustrated with a Primary data store and Backups1-N for the Primary data store. The Data Repository 140A may manage the Primary data store and backups, in some embodiments, or the Primary data store and backups may be managed by a data storage service, illustrated in FIG. 7, described below.

Figure 4:
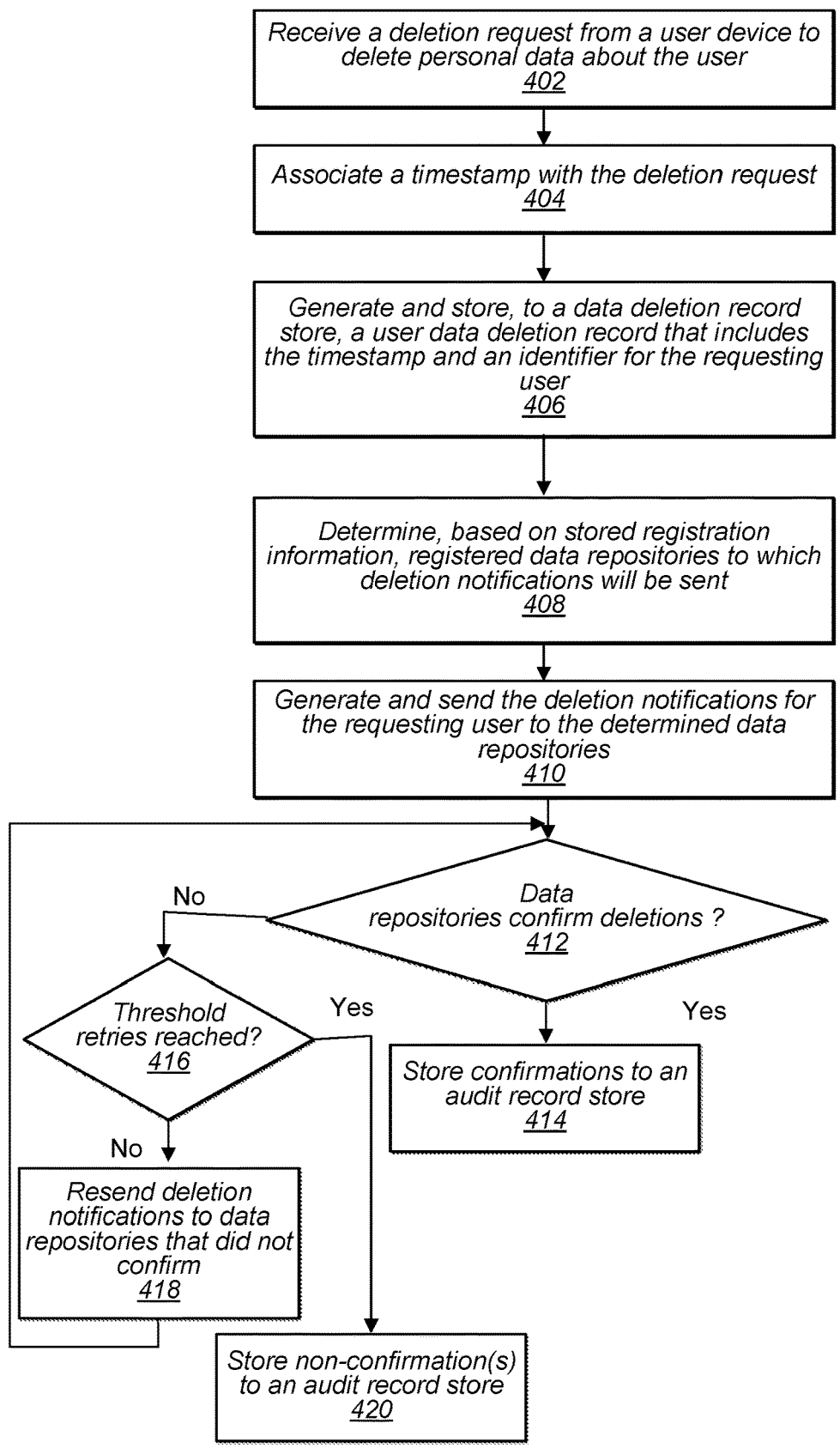
FIG. 4 is a process diagram that illustrates a data deletion process for a system that implements data subject erasure across multiple distributed data repositories, according to some embodiments.

In FIG. 1A, a Data Deletion Notification Service 110 is illustrated with a data store, Deletion Request Records 114. The Data Deletion Notification Service 110 maintains records of data deletion requests from users (e.g., users associated with user accounts) made via user Devices 102A-N. As illustrated in FIG. 4, described below, the Data Deletion Notification Service 110 receives data deletion requests from the user devices, stores a record of the request, and generates deletion notifications that are sent out to the data repositories such that the data requested to be deleted can be deleted from any and all of the various data repositories where it was stored. In the illustrated embodiment, Data Deletion Notification Service 110 is illustrated with network connections to network 170 as well as with other connections to the Data Repositories 140A-N and X-Z and Server 130N. While FIG. 1A illustrates that the Data Deletion Service 110 acts as a single contact endpoint for making data deletion requests and then disseminates multiple deletion notifications to the various Data Repositories over the other connections, it is contemplated that the data deletion requests and the deletion notifications may be sent over the same network, in embodiments, without limitation.

FIG. 1A illustrates that at least some systems maintain multiple backups for at least some of the data repositories. For example, some data repositories maintain a series of backups, each of the series made at a different time. In some embodiments, a set of backups may be retained for a backup retention window period of time that expires. Some systems may save automated backups of a primary instance for a specified backup window period of time. In a database example, a system may create a snapshot of an entire database instance for a user account or for an entire data repository, backing up the entire database instance and not just individual databases. The system may save the automated backups of the database instance according to a backup retention period that is specified in a policy or otherwise. For some systems, it may be possible to recover the database to any point in time during the backup retention period.

It is contemplated that User Devices 102A-N may interact directly with the Data Deletion Notification Service 110 endpoint or may appear to be interacting with an interface provide via Servers 130A-N which forward the requests to the Data Deletion Notification Service 110 endpoint, in some embodiments.

In some embodiments, Data Deletion Notification Service 110 may be operated on a network separate from the network on which the data repositories operate, and/or may be operated by an entity other than the entity that controls the data repositories.

Figure 1B:
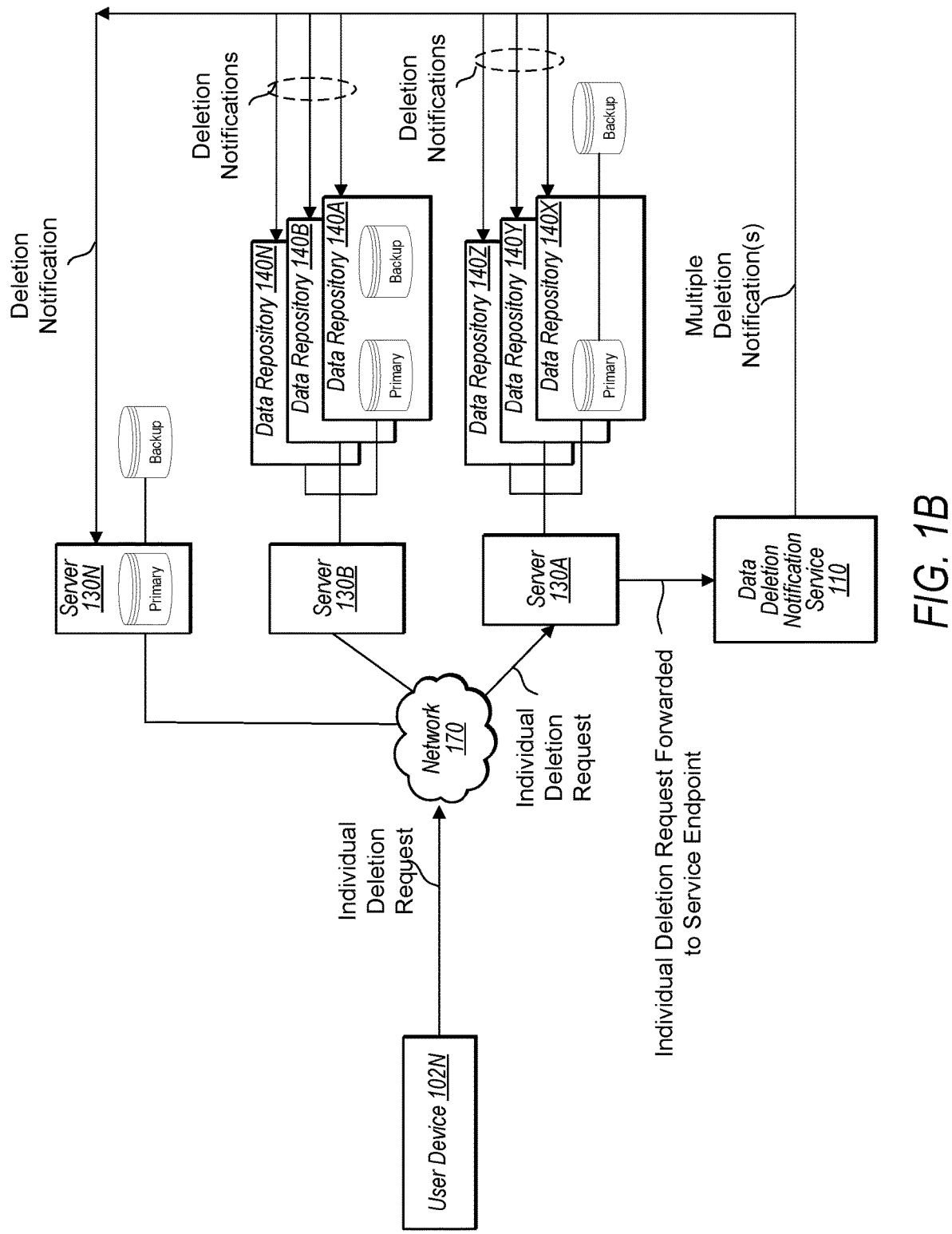

FIG. 1B illustrates a system architecture combined with data flows that corresponds to a process of individual user data deletion illustrated in FIG. 4, described below. In FIG. 1B an individual deletion request is sent from User Device 102N over network 170 to Server 130A. Server 130A may receive the request via an interface (e.g., GUI, CLI or otherwise) and forward the request to an endpoint associated with the Data Deletion Notification Service 110. In at least the illustrated embodiment, the network endpoint may act as a common, single endpoint where all such user data deletion requests are sent to engage the Data Deletion Notification Service 110. For example, Servers 130B and 130N in FIG. 1B may send graphical user interface elements to other user devices, such as user devices 102A and 102B via which the Servers 130B and 130N may receive other individual deletion requests which the Servers 130B and 130N would forward to the Data Deletion Notification Service 110 endpoint. The Servers 130A-N may forward the requests in accordance with a data deletion API particular to the Data Deletion Notification Service 110, in embodiments.

FIG. 1B illustrates that, in some embodiments, an individual deletion request, received by the Data Deletion Notification Service may be processed and cause multiple deletion notifications to be sent to multiple data repositories. In some embodiments, receipt of a single deletion request may result in deletion notifications being sent to all of the registered data repositories (e.g., Data Repositories 140A-N, 140X-Z, Server 130N), even to repositories that are not related to one another but have nonetheless stored that particular user's personal data for disparate transactions, in some embodiments. The Data Deletion Notification Service 110 may operate as a single endpoint (e.g., a URL or network address) for deleting data that was created over disparate transactions across multiple distinct systems.

In a particular example, data repository 140N stores data for server 130B that stores personal user data about an individual user based on interactions between the user's device 102N and the server 130B (e.g., a server supporting e-commerce). Another data repository 140X stores data for server 130A that stores the same personal user data about the same individual user, but based on other interactions between the user's device 102N and server 130A (e.g., a server supporting social networking). The Data Deletion Notification Service 110 may send the notifications of a deletion request for that user to both of the data repositories 140N and 140X, even if the user was unaware that the user's personal data was stored at the two different repositories.

Figure 1C:
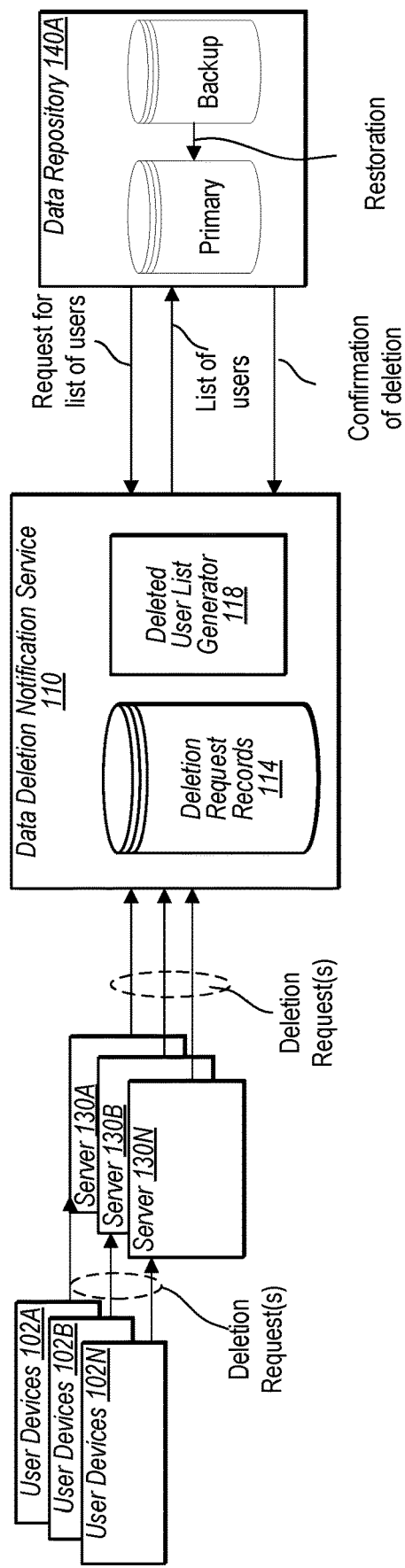

FIG. 1C illustrates request/response data flows among a distributed system that implements data subject erasure via a data deletion notification service. In particular, Data Repository 140A is illustrated as performing a restoration of a Primary data store (e.g., illustrated in FIGS. 5 and 6, described below) based on a backup data store within the context of a distributed system that implements data subject erasure via a data deletion notification service.

In the illustrated embodiment, User Devices 102A, 102B, 102N make deletion request (e.g., to delete personal or other data) via interfaces provided via Servers 130A, 130B, 130N that forward the deletion requests to Data Deletion Notification Service 110. Data Deletion Notification Service 110 processes the deletion requests (e.g., storing records of the data deletion requests) and distributing corresponding deletion notifications to registered repositories (e.g., as illustrated in FIG. 1B). In the illustrated embodiment, as part of performing a restoration process, Data Repository 140A sends a request (e.g., a request with an identifier of the requesting data repository, and a timestamp) to the Data Deletion Notification Service for a list of users that have requested data deletion and the Deleted User List Generator 118 generates the list (e.g., based on the records in Deletion Request Records 114) and responds back to the Data Repository 140A with the generated list of users. The Data Repository 140A uses the list of users in performance of the restoration (e.g., removing user data indicated in the list) to avoid reintroducing previously-deleted user data that could possibly be reintroduced via the backup (in some systems, data repositories respond to deletion notifications by deleting user data from a primary repository without deleting the copy of the data from the backup—leaving open the opportunity for reintroduction of previously-deleted data). Once the Data Repository 140A completes the restoration and corresponding deletion of user data, the Data Repository 140A confirms the deletion with a confirmation message to the Data Deletion Notification Service 110 (which may store the confirmation in an audit record, in embodiments.).

Figure 2:
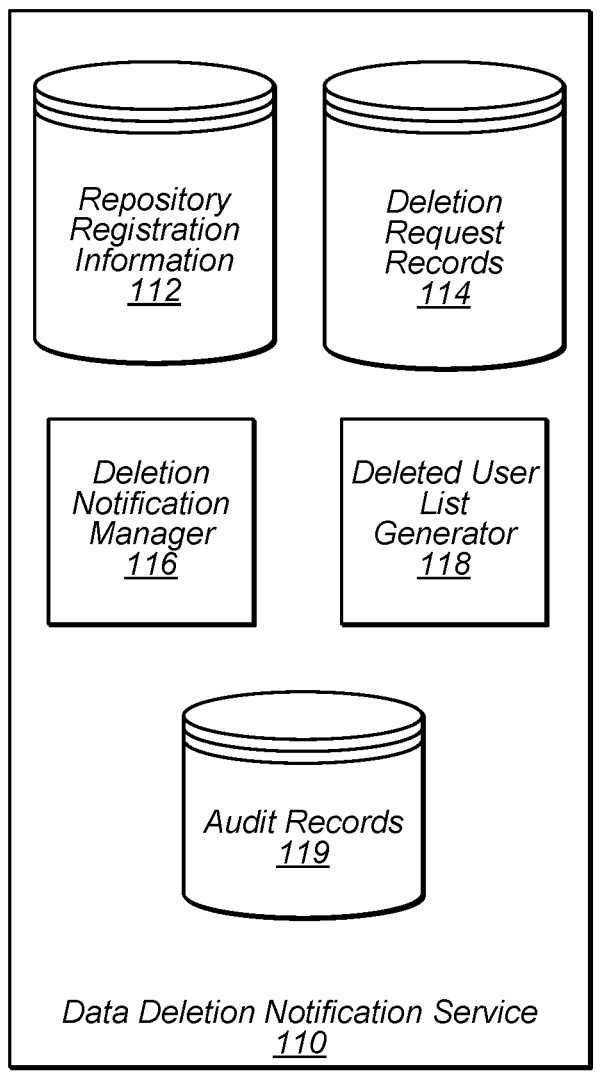
FIG. 2 is a block diagram illustrating a data deletion notification service that implements logic for data subject erasure across multiple distributed data repositories, according to some embodiments.

FIG. 2 is a block diagram illustrating a data deletion notification service that implements logic for data subject erasure across multiple distributed data repositories, according to some embodiments. In the illustrated embodiment, the Data Deletion Notification Service 110 includes data stores (Repository Registration Information 112, Deletion Request Records 114, and Audit Records 119) as well as Deletion Notification Manager 116 (having deletion notification logic) and Deleted User List Generator 118 (having deleted user list logic). Repository Registration Information 112 may be obtained via an interface (e.g., a dedicated graphical user interface (GUI) or application program interface (API) or command-line interface (CLI)) as part of a registration process similar to the registration process illustrated in FIG. 3, described below. Deletion Request Records 114 may be generated based on deletion requests (received during a process similar to the deletion request process illustrated in FIG. 4, describe below) and Audit Records 119 may be recorded as part of various functionality that implements data subject erasure across multiple distributed data repositories (e.g., illustrated in FIGS. 4, 5 and 6, described below).

Deletion Notification Manager 116 may perform functionality similar to that illustrated in FIG. 4, described below, responding to deletion requests from users by multiplying and disseminating the deletion requests (as deletion notifications) out to numerous data repositories where the user's personal data may be stored. Deleted User List Generator 118 may perform functionality similar to that illustrated in FIG. 5, described below, responding to requests from data repositories to generate lists of users that have requested deletion of personal data (in some embodiments, the data repositories may use the list to delete personal data from backup data used in a restoration, for example).

Figure 3:
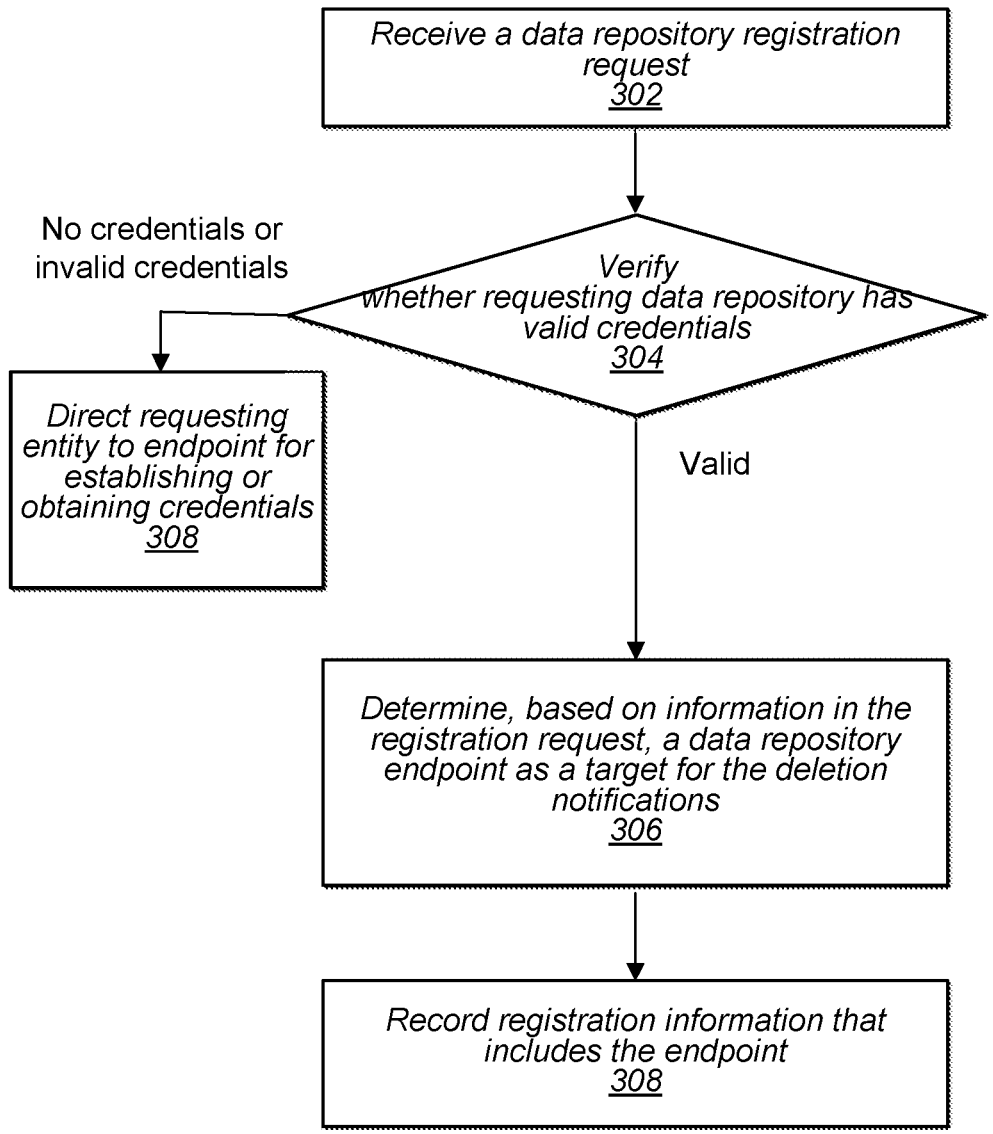
FIG. 3 is a process diagram illustrating a data repository registration process for a system that implements data subject erasure across multiple distributed data repositories, according to some embodiments.

FIG. 3 is a process diagram illustrating a data repository registration process for a system that implements data subject erasure across multiple distributed data repositories, according to some embodiments. In embodiments, Data Repositories may be required to register with Data Deletion Notification Service 110, to receive data deletion requests and/or to request lists of users that have requested deletion of personal data. The registration information may be stored in Repository Registration Information 112, illustrated in FIG. 2, in embodiments.

At block 302 a data repository registration request is received. In some embodiments, the registration request may include various registration information, such as but not limited to an identifier of and/or credentials for the data repository and/or an endpoint at which the data repository will receive data deletion notifications. The registration request may be received in accordance with a registration API for the data deletion notification service, in some embodiments. At block 304, a verification of whether the requesting data repository has valid credentials is performed. For example, if no credentials are received with the request, the service may direct the requesting entity (e.g., an administrator user account or the requesting repository or the like) to an endpoint (e.g., an identify and access management service or similar) for establishing or obtaining credentials (block 308). If credentials are received, the service may validate the credentials (either internally or at an identity and access management service or similar) and respond with an error for invalid credentials or respond by proceeding to block 306 for case of valid credentials.

At block 306, a data repository endpoint is determined as a target to which deletion notifications are to be disseminated by the deletion notification service. The target endpoint may be determined from the contents of the registration request (e.g., according to a registration API) for example. Registration information, including, but not necessarily limited to an identifier of the data repository and target endpoint are recorded in the Repository Registration Information 112. In some embodiments, the stored registration information may include specification of how the data repository is to receive the deletion notifications (e.g., a format, particular parameters, according to a deletion API, according to a particular way a user id is tracked, according to a default service API, etc.).

It is contemplated that in some embodiments data repositories may register with the data deletion notification server after the data repositories have been gathering data, such as personal data. For example, such as, but not limited to, when two distinct systems with separate data repositories are brought together in a same system, causing previously-existing data repositories, with prior-existing personal data, to be added to the group of data repositories that are already registered with the data deletion notification service. Whereas some embodiments of a data deletion notification service may require registration by data repositories when data repositories start-up (e.g., to ensure all data deletions are handled correctly by the data deletion notification service) some embodiments may provide for registration of data repositories after the data repositories have been storing data. In at least some such systems, the newly-registered data repositories with prior-existing data (data obtained prior to the registration) may request, from the data deletion notification service, a list of users that have previously requested deletion of data since a specified time (e.g., since a time when the newly-registered data repositories started storing data) and use the list to ensure that data that corresponds to the users on the list is deleted from the newly-registered repositories, generating a confirmation that is stored as an audit record, in embodiments. The list of users may be generated by the data deletion notification service in a manner similar to that illustrated in FIG. 5, described below.

It is contemplated that in some embodiments the previously-existing data repositories with the prior-existing personal data may provide the data deletion notification service with a list of users that have (previous to the combination of the repositories with the already-registered repositories) requested deletion of data for those previously-existing data repositories with the prior-existing personal data. Such information may be used to delete data in the already-registered data repositories, in some embodiments.

FIG. 4 is a process diagram that illustrates a data deletion process for a system that implements data subject erasure across multiple distributed data repositories, according to some embodiments. The process may be performed by one or more components of Data Deletion Notification Service 110, for example. In some embodiments, the Data Deletion Notification Service 110 is a single endpoint where users can request deletion of personal data, but the service carries out deletions of the user's personal data across distributed, even unrelated, data repositories that the requesting user may not even know about. At least because the requesting user may not even be aware that personal user data is stored in some of the (e.g., behind the scenes, or backend) distributed data repositories, the requesting user may be unable to request that data be deleted. In some embodiments, the combination of the requirement for data repositories to register with the Data Deletion Notification Service prior to processing data and the Data Deletion Notification Service's single endpoint for requesting deletions that turns a single request into multiple deletion notifications disseminated to many or all of the registered date repositories performs functionality that could not otherwise be performed. Furthermore, in some embodiments, the user does not even have access to the various data repositories (backend repositories or the like) where the personal data may be stored. Further making deletion otherwise impossible, in some embodiments.

At block 402, a deletion request is received from a user device to delete personal data about the user (in some embodiments, a user device may be associated with a user account). Reference to personal data is made throughout the specification, but it is contemplated that similar functionality is also applicable to other types of data besides personal data of the user, in embodiments.

The deletion request may be received via any of various interfaces (e.g., API, CLI or GUI) implemented by the Data Deletion Notification Service, in embodiments. A timestamp is associated with the deletion request (block 404). In some embodiments, the service may use a timestamp from within the request, or may generate a timestamp from an internal clock at the time the request is received. In some embodiments, the service may use a timestamp created when deletion notifications based on the request are sent or a timestamp based on confirmation of deletion of the data, in various embodiments.

At block 406, a data deletion record is generated and stored, the data deletion record includes the time stamp and an identifier for the requesting user, for example. In some embodiments, the identifier of the user may be obfuscated. For example, the service may apply a cryptographic function to a user identifier to produce non-personally-identifiable data that is stored. In another example, the service may apply a one-way cryptographic function to an identifier (e.g., a delete subject id) of the user from the request to generate a hash value that is stored in the deletion record. In some embodiments, various different types of identifiers (identifiers used to identify the requesting entity) may be stored for a single data deletion request (e.g., such as, but not limited to for compliance reasons) such that the deletion-requesting entity can be identified more than one way. For example, an obfuscated version of a government identification number may be stored, and an obfuscated version of a username may be stored, and/or an obfuscated version of a corresponding e-mail address may be stored, and/or an obfuscated version of a corresponding address may be stored and associated with a particular deletion request, etc., without limitation. Such functionality may be performed by User Deletion Logic 116 in FIG. 1A, for example. Similar cryptographic functionality may be implemented by the data repositories to perform functionality described herein, in embodiments.

A determination, based on stored registration information (e.g., Repository Registration Information 112) of the registered data repositories to which deletion notifications will be sent is made (block 408), by Deletion Notification Manager 116 for example. In some embodiments, deletion notifications may be sent to all of the registered data repositories.

In some embodiments, Data Deletion Notification Service 110 may include logic for determining a subset of the registered data repositories to which data deletion notifications will be sent. For example, in some embodiments, the data repositories may provide (e.g., via an interface, at the time of registration) a list of users for which the repository stores personal data (e.g., in the form of a space-efficient data structure such as a bloom filter or other probabilistic data structure, or the like). The repositories may provide updates to the list, in embodiments. In some such embodiments, the Data Deletion Notification Service 110 may determine a subset of the registered data repositories to send deletion notifications to, based on which registered repositories indicated that personal data of the deletion-requesting user is stored by that repository.

At block 410, the deletion notifications for the requesting user are generated and sent to the determined data repositories (e.g., by Deletion Notification Manager 116). In some embodiments, multiple deletion notifications are sent to respective data repositories, based on a single deletion request from a user device. It is contemplated that in some embodiments, a single deletion notification may be sent to a single data repository, either in a case where there is only a single repository for the system (registration may not be necessary in this case), or in the case where the user data is determined to only need deleting in a single one of the registered repositories, as examples.

Audit Records and Confirmations

At block 412 a determination is made whether the one or more data repositories that deletion notification were sent to confirmed that the deletion of the data was performed at that repository. In some embodiments, Deletion Notification Manager 116 may include logic that processes confirmations received from the data repositories. For confirmations that are received (block 412, yes) the confirmations are stored to an audit records store (block 414) (e.g., Audit Records 119). Audit records may include such data as a system id where the deletion was performed, the delete subject id (obfuscated), and timestamp of the deletion request for each deletion, etc. For confirmations that are not received (block 412, no, either after waiting some threshold period of time or in near-real-time with the deletion notification or similar) the logic may determine whether respective ones of the deletion notifications have been retried some threshold number of times (block 416) and if not (block 416, no) resend the one or more respective deletion notification(s) that are not confirmed (block 418). If some threshold number of retries have been performed (block 416, yes) the logic may store (block 420) a non-confirmation record to an audit record store (e.g., Audit Records 119). In some embodiments, a trouble-ticket may be opened for non-confirmations.

Figure 5:
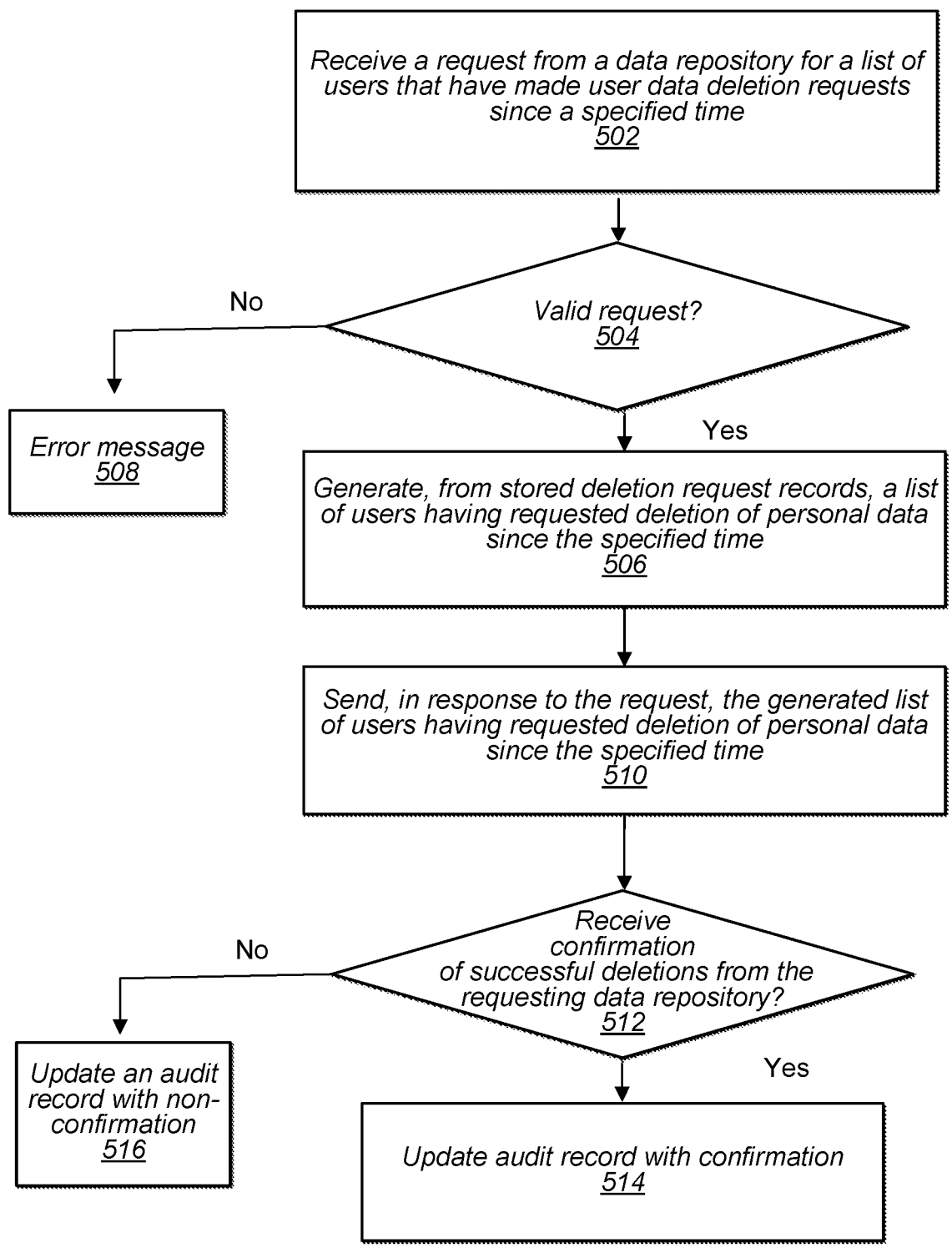
FIG. 5 is a process diagram illustrating generation of a list of users that requested deletion of data since a specified time for a system that implements data subject erasure across multiple distributed data repositories, according to some embodiments.

FIG. 5 is a process diagram illustrating generation of a list of users that requested deletion of data since a specified time for a system that implements data subject erasure across multiple distributed data repositories, according to some embodiments. The functionality described may be implemented by one or more components of a data deletion notification service, such as by the Deleted User List Generator 118, in embodiments.

At block 502, a request from a data repository for a list of users that have made user deletion request since a specified time is received (e.g., via an interface such as according to an API). The request may or may not include a timestamp. For example, if the system is configured to delete all personal user data for all users that have ever requested personal data deletion, no timestamp may be required. For systems that delete user personal data in accordance with backups that are retained according to a backup retention expiration window, a timestamp may be included in the request.

The request is validated (block 504). For example, the service may determine whether the request is from a registered data repository and/or whether valid credentials are provided with the request, in embodiments. For an invalid request, an error message may be generated and sent (block 508). At block 506, a list of users having requested deletion of personal data since the specified time is generated from stored deletion request records (e.g., from Deletion Request records 114, by Deleted User List Generator 118). In some embodiments, the service may generate a list particular to the requesting repository. For example, in some embodiments, during a registration process, data repositories may provide the Data Deletion Notification Service with a list of users for which the repository stores personal data, and may provide updates to that list, when personal data of a new user is obtained and stored for example. When the service receives a list request from such a particular repository, the deleted user list generator may limit entries on the list to only those users for which the particular repository stores personal data, leaving other users whose data has been stored at other repositories but not the particular repository, off of the list.

In various embodiments, the data deletion notification service may apply various filters when generating the user list. For example, the data deletion notification service may use data repository information obtained during the registration process to filter users out so as to prevent the users from being included in the list. Data repository registration information, such as a timestamp or date associated with when the data repository registered with the service, or a date or timestamp associated with the data repository startup date, may be used to prevent users that requested deletion prior to those dates/timestamps from being included in the list, in embodiments.

At block 510, the generated list of users having requested deletion of personal data since the specified time is sent in response to the request (e.g., sent by the Data Deletion Notification Service to the requesting data repository). Confirmation of successful deletions of the users' personal data may be received from the requesting repository (block 512) and the audit record updated with the confirmation(s) (block 514). If confirmation is not received (block 512, no) an audit record (e.g., Audit Records 119) may be updated with non-confirmation (block 516).

In some embodiments the Data Deletion Notification Service (e.g., the Deleted User List Generator 118) may modify the time sent in the request to use a modified timestamp when generating the list. For example, the Deleted User List Generator 118 may apply a buffer amount of time to the time specified in the list request such that the time used to generate the list of users is earlier (e.g., earlies than the backup data creation point-in-time if that is what was sent in the request). Such an adjustment to the time may compensate for network delays or processing delays, ensuring that all of the deletions are accounted for in the requested list, in some embodiments.

In some embodiments, the data deletion notification service may delete user data deletion records (delete from Deletion Request Records 114) older than the oldest backup retention window expiration (e.g., to make the corresponding memory space available or for compliance reasons). Since, in some systems, backups are not retained past the backup retention window expiration, it may not be necessary to retain deletion request records past the retention window expiration.

Figure 6:
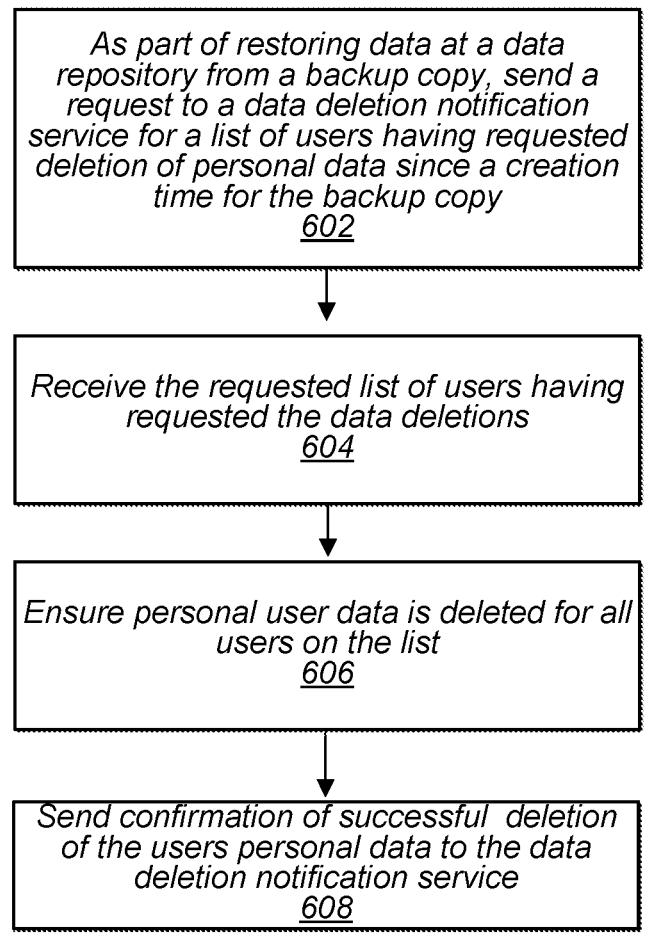
FIG. 6 is a process diagram illustrating erasure of data during a restoration from backup, for a system that implements data subject erasure across multiple distributed data repositories, according to some embodiments.

FIG. 6 is a process diagram illustrating erasure of data during a restoration from backup, for a system that implements data subject erasure across multiple distributed data repositories, according to some embodiments. In some embodiments, the erasure is an erasure of data that was previously deleted from a primary repository, the erasure in some ways repeating the previous erasure but performing the erasure on data from a backup copy of the primary data store, as part of a restoration of the primary data store, the restoration using data from the backup. In some embodiments, data repository restoration implementation may be system-specific and custom deletion processes in accordance with the techniques disclosed herein, are contemplated, without limitation. In some embodiments, the deletions are performed at the service-level of the data repository, instead of at the underlying storage infrastructure level.

A restoration may be performed for any of various reasons, to repair a corrupt primary data store, to put the primary data store back into a particular prior state, etc. Generally, a system may have multiple backups of a primary data store, and the restoration may be performed using a particular one of the backup copies of the data store (e.g., a secondary data store or a snapshot) and the backup used for the restoration will be associated with a timestamp indicating when the particular backup was generated. The data repository performing the restoration may perform the process illustrated in FIG. 6 to ensure that personal data that was previously-deleted from the primary data store is also deleted from the restored data store, prior to making the restored primary data store live, or otherwise accessible to requests.

At block 602, as part of restoring data at a data repository from a backup copy, a request is sent to a data deletion notification service for a list of users having requested deletion of personal data since a creation time for the backup copy. In some embodiments the requesting entity (e.g., a data repository) may adjust the time sent in the request. For example, the requesting entity may apply a buffer amount of time to the data creation point-in-time such that the time specified in the request is earlier than the backup data creation point-in-time. Such an adjustment to the time may compensate for network delays or processing delays, ensuring that all of the deletions are accounted for in the requested list, in some embodiments.

The request may be sent by the repository to the Deleted User List Generator 118 of the Data Deletion Notification Service 110 according to an API, in embodiments. At block 604, the requested list of users having requested the data deletions is received back (by the requesting repository). The repository may be responsible for ensuring personal user data for all users on the list is deleted from restored data of the primary data store (block 606). For example, the repository may include logic that filters the data from the backup to remove the personal data prior to storing the data from the backup to the primary data store. In another example, the repository may transfer all of the data from the backup to the primary data store and then perform the deletions prior to making the restored primary data store live or otherwise accessible. A confirmation of successful deletion of the personal user data is sent to the data deletion notification service (block 608) to be stored in the Audit records 119.

In some embodiments the backup may include other data for the users on the list that is not personal data. In some embodiments the data repository may need only delete personal data for the users on the list, but other data for those users may remain in the restored data at the data repository.

Figure 7:
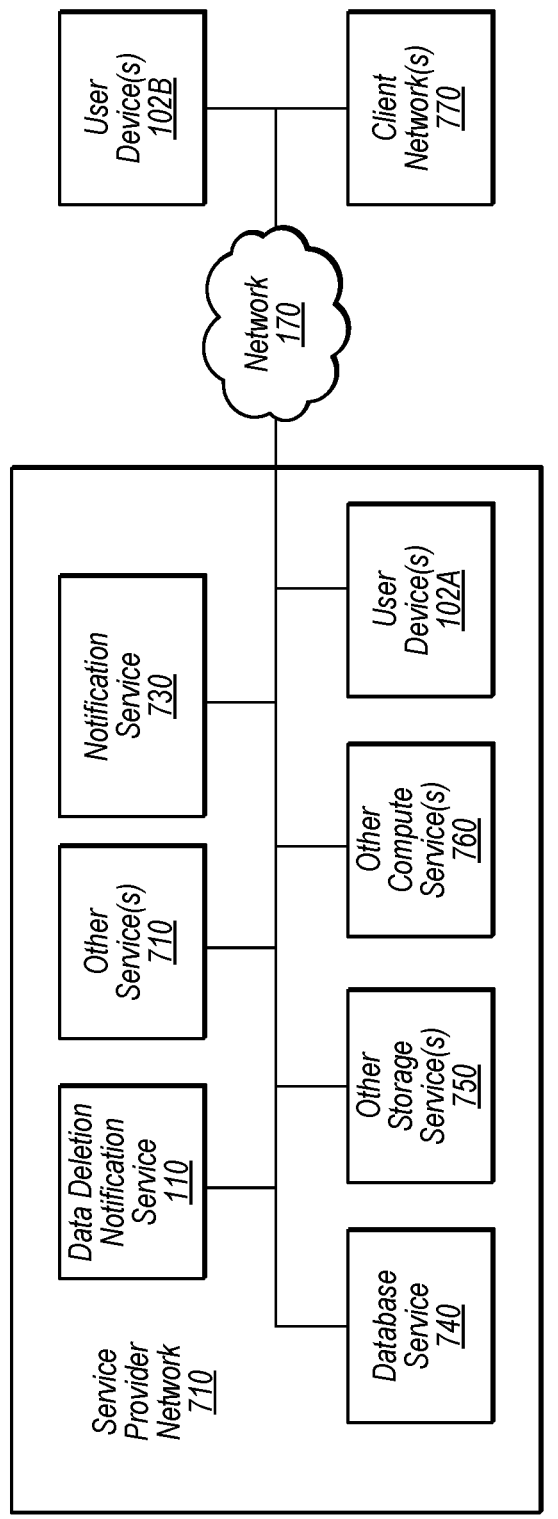
FIG. 7 is a logical block diagram illustrating an example service provider network that implements data subject erasure across multiple distributed data repositories, according to some embodiments.

FIG. 7 is a logical block diagram illustrating an example service provider network that implements data subject erasure across multiple distributed data repositories, according to some embodiments. In embodiments, nodes of the Service Provider Network 710 may host one or more services (e.g., service-provider provided services accessed by customers/clients or a customer's services may execute on the hosts of the service provider, or combinations thereof, etc.) In the illustrated embodiment, User Devices 102 (e.g., both external User Devices 102B, via a client network 770 or the like, and/or internal User Devices 102A) may access the services of the service provider network 710 via network 170, for example.

In the non-exhaustive illustrated embodiment, service provider network 710 hosts resources such as virtual compute instances and block-based storage, but also services such as Data Deletion Service 110, other service(s) 710, Notification Service 730, Database Service 740, Other Storage service(s) 750 (e.g., scalable object storage infrastructure, scalable, shared file storage service, durable, low-latency block-level storage volumes, etc.) and Other Compute Service(s) 760, etc.

Various components of, and associated with, the Data Deletion Notification Service illustrated in FIGS. 1 and 2 may be implemented in various combinations of the above-noted resources and/or services illustrated in FIG. 7. For example, in some embodiments, one or more of the components illustrated for Data Deletion Notification Service 110 in FIG. 2 may be implemented using one or more services among the services of the service provider as illustrated in FIG. 7. For instance, one or more of the Repository Registration Information 112, Deletion Request Records and/or the Audit Records 119 may be implemented using the Database Service, 740, or Other Storage Service(s) 750. In some instances, one or more of the Deletion Notification Manager 116 and/or the Deleted User List Generator 118 may be implemented on or across Compute Service(s) 760 or Other Services (710) for example.

In some embodiments, one or more portions of the Data Repositories 140A-N, X-Z may be implemented by some combination of the resources and/or services illustrated in FIG. 7. For example, business or other processing logic of a data repository may be implemented at a compute service such as Compute Service(s) 760 or Other Service(s) 710 and primary and/or secondary (e.g., backup) data stores may be implanted at any of Database Service, 740, or Other Storage Service(s) 750 In at least some embodiments, at startup, Data Repositories 140A-N, X-Z may be required to register with a Notification Service 730, to ensure that the Data Repositories are notified of deletion events created and disseminated by the Data Deletion Notification Service 110.

Some embodiments of a Data Deletion Notification Service 110 may provide various APIs, such as, but not limited to a software development kit (SDK) set of tools for use by the Data Repositories to implement deletion of personal data in response to deletion notifications. APIs of the Data Deletion Notification Service 110 may include a repository registration API for registration of data repositories, and/or a deletion request API for requesting deletions of personal data. Another API may be provided for notifying the data repositories of the deletions, and yet another for the data repositories to make requests for lists of users that have requested deletion of personal data.

Figure 8:
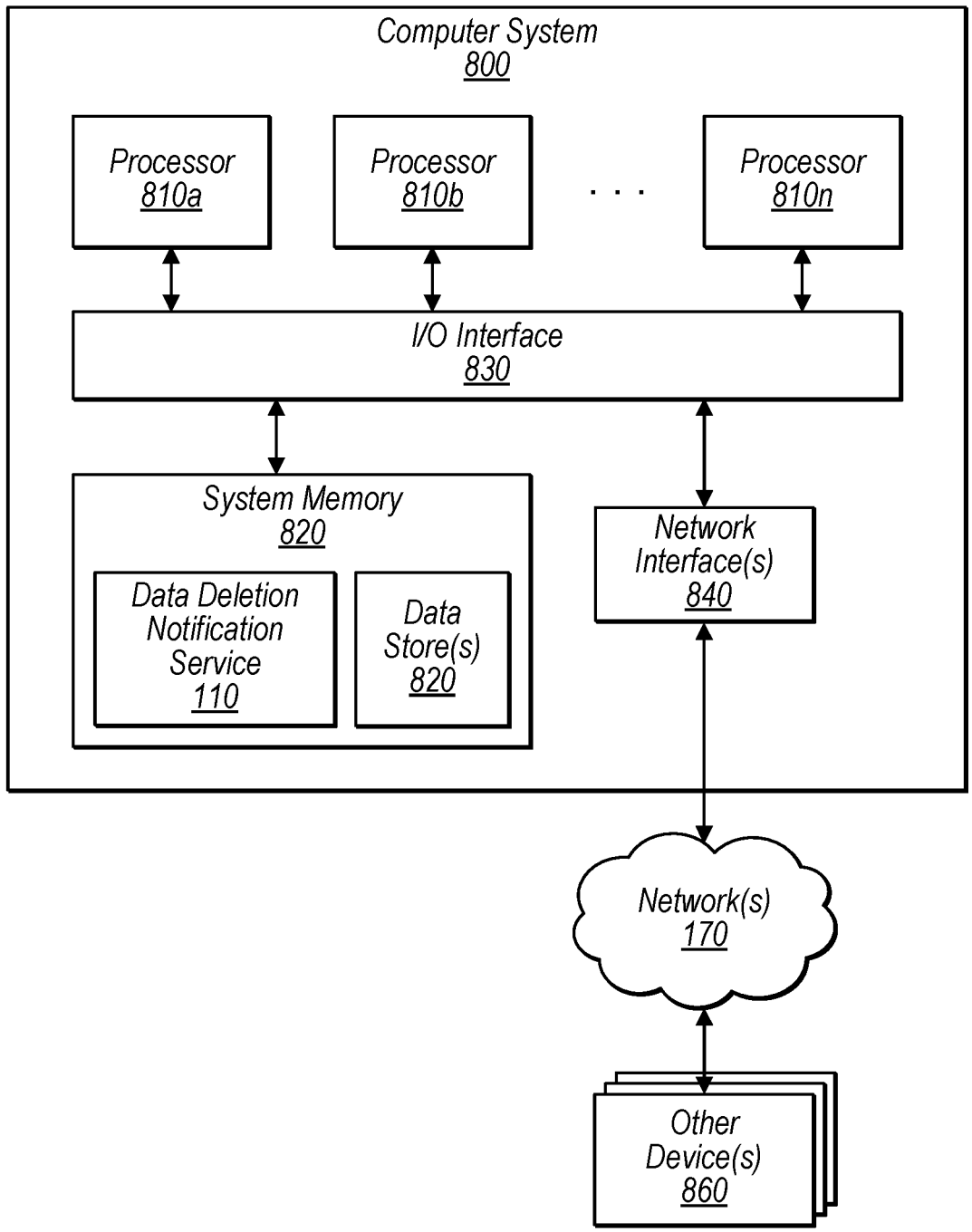
FIG. 8 is a block diagram showing an example computing system to implement the various techniques described herein, according to some embodiments.

FIG. 8 is a block diagram showing an example computing system to implement the various techniques described herein, according to some embodiments. For example, in one embodiment, the above-described service that implements data subject erasure across multiple distributed data repositories may be implemented by one or more of a computer system, for instance, a computer system as in FIG. 8 that includes one or more processors executing program instructions stored on a computer-readable storage medium coupled to the processors. In the illustrated embodiment, computer system 800 includes one or more processors 810a-n coupled to a system memory 820 via an input/output (I/O) interface 830. Computer system 800 further includes a network interface 840 coupled to I/O interface 830. While FIG. 8 shows computer system 800 as a single computing device, in various embodiments a computer system 800 may include one computing device or any number of computing devices configured to work together as a single computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be one embodiment of a computer-accessible medium configured to store instructions and data accessible by processor(s) 810. In various embodiments, system memory 820 may be implemented using any non-transitory storage media or memory media, such as magnetic or optical media, e.g., disk or DVD/CD coupled to computer system 800 via I/O interface 830. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840. In the illustrated embodiment, program instructions (e.g., code) and data implementing one or more desired functions, e.g., functionality with regard to the various illustrated workflows etc. described above in FIGS. 3-6, are shown stored within system memory 820 as data deletion notification service logic 110 and data store(s) 820 (e.g., Registration information 112, Deletion Request Records 114, Audit Records 119). In some embodiments, the system memory 820 may implement logic of a data repository that performs the functionality illustrated in FIG. 6).

In one embodiment, I/O interface 830 may be configured to coordinate I/O traffic between processor 810, system memory 820, and any peripheral devices in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices 860 attached to a network or networks 170. In various embodiments, network interface 840 may support communication via any suitable wired or wireless general data networks, such as types of Ethernet network, for example. Additionally, network interface 840 may support communication via telecommunications/telephony networks such as analog voice networks or digital fiber communications networks, via storage area networks such as Fiber Channel SANs, or via any other suitable type of network and/or protocol.

In some embodiments, system memory 820 may be one embodiment of a computer-accessible medium configured to store program instructions and data as described above for FIGS. 1A-7. Generally speaking, a computer-accessible medium may include non-transitory storage media or memory media such as magnetic or optical media, e.g., disk or DVD/CD coupled to computer system 800 via I/O interface 830. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various systems and methods as illustrated in the figures and described herein represent example embodiments of methods. The systems and methods may be implemented manually, in software, in hardware, or in a combination thereof. The order of any method may be changed, and various elements may be added, reordered, combined, omitted, modified, etc.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly.

What is claimed is:

1. A system, comprising:
    a plurality of data repositories configured to store personal data about individual users of a plurality of users;
    one or more computers comprising respective processors and memory configured to implement a data deletion notification service to provide a single endpoint to receive deletion requests from the users to delete respective data stored at the plurality of data repositories and to distribute indications of the deletion requests to the plurality of the data repositories, wherein to provide the single endpoint and to distribute the indications the data deletion notification service is configured to:
        store registration information for the plurality of data repositories;
        receive, at the single endpoint, deletion requests from respective users of the plurality of users to delete personal data about the respective users;
        send notifications of the deletion requests to respective ones of the data repositories based on the registration information;
        store deletion request records of users of the plurality of users that have requested to have their personal data deleted, wherein the deletion request records comprise respective timestamps for when the respective deletion requests were received by the data deletion notification service;
        receive a request from one of the plurality of data repositories for a list of users having requested deletion of personal data since a time specified in the request; and
        responsive to the request, based on the deletion request records and timestamps, provide the list of users having requested deletion of personal data since the specified time.

2. The system of claim 1, wherein:
    one or more of the registered data repositories is configured to store data for a first server that is configured to store the personal data about an individual one of the plurality of users based on interactions between a user device of the individual user and the first server;
    one or more others of the registered data repositories is configured to store data for a second server that is configured to store the personal data about the individual user based on other interactions between the user device and the second server; and
    to send the notifications of the deletion requests the data deletion notification service is further configured to:
        send, based on a single one of the deletion requests, respective notifications of the deletion request to the first and second registered data repositories.

3. The system of claim 1, further comprising:
    one or more computers comprising respective processors and memory configured to implement network-based compute services of a service provider network that provides the network-based compute services to a plurality of client networks;
    one or more computers comprising respective processors and memory configured to implement network-based storage services of a service provider network that provides the network-based storage services to a plurality of client networks;
    wherein the data deletion notification service is implemented by one or more of the network-based compute services of the service provider network; and
    wherein the registration information and deletion request records are stored in one or more data stores provided by one or more of the network-based storage services of the service provider network.

4. The system of claim 1, further comprising:
    one or more computers comprising respective processors and memory configured to implement network-based compute services of a service provider network that provides the network-based compute services to a plurality of client networks;
    one or more computers comprising respective processors and memory configured to implement network-based storage services of a service provider network that provides the network-based storage services to a plurality of client networks;
    wherein one or more of the data repositories are implemented by the network-based compute and network-based storage services of the service provider network.

5. A method, comprising:
    performing by one or more computing devices:
        implementing a data deletion notification service to provide a single endpoint to receive deletion requests from users to delete respective data stored at a plurality of data repositories and to distribute indications of the deletion requests to the plurality of data repositories, wherein to provide the single endpoint to receive deletion requests and to distribute the indications, the one or more computing device perform:

sending, by a data deletion notification service and responsive to receipt of deletion requests to delete personal data about respective users from respective users of a plurality of users, notifications of the deletion requests to respective ones of a plurality of data repositories;

storing, by the data deletion notification service, deletion request records for individual ones of the users that have requested to have their personal data deleted, wherein the deletion request records comprise respective timestamps associated with the respective deletion requests received by the data deletion notification service;

receiving, by the data deletion notification service, a user list request from one of the plurality of data repositories for a list of users having requested deletion of personal data;

generating, by the data deletion notification service and based on the deletion request records, the user list of users having requested deletion of personal data; and providing, responsive to the request, the list of users having requested deletion of personal data.

6. The method of claim 5, further comprising:
processing registration requests from the data repositories via a registration interface;
storing registration information from the requests in a registration data store of the data deletion notification service; and
determining the plurality of data repositories to which the notifications of deletions are sent based at least in part on the registration information stored in the registration data store, wherein notifications of the deletion requests are not sent to data repositories that are not registered.

7. The method of claim 6, further comprising:
determining, based on information in the registration requests, endpoints of the data repositories as targets for the notifications of the deletion requests; and
storing the determined endpoints for the data repositories in the registration data store.

8. The method of claim 5, further comprising:
receiving confirmations of the deletion requests from the data repositories; and
storing the confirmations of the deletion requests to an audit record data store.

9. The method of claim 5, further comprising:
resending, responsive to not receiving an expected confirmation of deletion for an individual one of the notifications of the deletion requests from one of the data repositories, the notification of the deletion request to the data repository.

10. The method of claim 5, further comprising:
receiving, via an audit interface of the data deletion notification service, a request for confirmation of deletion of personal data for one or more of the plurality of users;
generating, based on confirmations for the one or more users stored in an audit record data store, a response to the request for confirmation; and
transmitting the response to the request for confirmation.

11. The method of claim 5, wherein said storing deletion request records comprises:

applying a cryptographic function to user identifiers, received in the deletion requests, to generate non-personally-identifiable output; and
storing the non-personally-identifiable output as part of the deletion request records.

12. The method of claim 5, wherein:
the received user list request is received in accordance with a user list request API that specifies that user list requests comprise a timestamp; and
the user list that is provided is limited to users with deletion request records having a timestamp later than the timestamp specified in the request.

13. The method of claim 12, further comprising:
applying, by the data deletion notification service, a time buffer to the timestamp from the request to determine a user list timestamp;
wherein said generating the user list comprises generating the user list based on the user list timestamp such that the user list is limited to users having deletion request records later than the user list timestamp.

14. The method of claim 5, further comprising:
determining an oldest backup retention window expiration for the plurality of data repositories; and
deleting, by the notification service, user data deletion request records older than the oldest backup retention window expiration.

15. One or more non-transitory computer-readable storage media storing program instructions, executable on or across one or more processors to perform:

implementing a data deletion notification service to provide a single endpoint to receive deletion requests from users to delete respective data stored at a plurality of data repositories and to distribute indications of the deletion requests to the plurality of data repositories, wherein to provide the single endpoint to receive deletion requests and to distribute the indications the program instructions are executable one or across the one or more processors to perform:

sending, responsive to receipt of deletion requests to delete personal data about respective users from respective users of a plurality of users, notifications of the deletion requests to respective ones of a plurality of data repositories;

storing deletion request records for individual ones of the users that have requested to have their personal data deleted, wherein the deletion request records comprise respective timestamps associated with the respective deletion requests;

receiving a user list request from one of the plurality of data repositories for a list of users having requested deletion of personal data;

generating, based on the deletion request records, the user list of users having requested deletion of personal data; and providing, responsive to the request, the list of users having requested deletion of personal data.

16. The one or more non-transitory computer-readable storage media of claim 15, storing program instructions executable on or across one or more processors to perform:
processing registration requests from the data repositories via a registration interface;
storing registration information from the requests in a registration data store; and
determining the plurality of data repositories to which the notifications of deletions are sent based at least in part on the registration information stored in the registration data store, wherein notifications of the deletion requests are not sent to data repositories that are not registered.

17. The one or more non-transitory computer-readable storage media of claim 16, storing program instructions executable on or across one or more processors to perform:
   determining, based on information in the registration requests, endpoints of the data repositories as targets for the notifications of the deletion requests; and
   storing the determined endpoints for the data repositories in the registration data store.

18. The one or more non-transitory computer-readable storage media of claim 15, storing program instructions executable on or across one or more processors to perform:
   receiving confirmations of the deletion requests from the data repositories; and
   storing the confirmations of the deletion requests to an audit record data store.

19. The one or more non-transitory computer-readable storage media of claim 15, storing program instructions executable on or across one or more processors to perform:
   resending, responsive to not receiving an expected confirmation of deletion for an individual one of the notifications of the deletion requests from one of the data repositories, the notification of the deletion request to the data repository.

20. The one or more non-transitory computer-readable storage media of claim 15, storing program instructions executable on or across one or more processors to perform:
   responsive to receipt, via an audit interface, of a request for confirmation of deletion of personal data for one or more of the plurality of users:
      generating, based on confirmations for the one or more users stored in an audit record data store, a response to the request for confirmation; and
      transmitting the response to the request for confirmation.

* * * * *